July 6, 1965 A. A. DE FALCO 3,193,648
TIME DELAY CONTROL DEVICE FOR ELECTRICAL CIRCUITS
Filed Oct. 1, 1962

ANGELO A. DE FALCO
INVENTOR.

BY Bobia + Fornero
ATTORNEYS

United States Patent Office 3,193,648
Patented July 6, 1965

3,193,648
TIME DELAY CONTROL DEVICE FOR ELECTRICAL CIRCUITS
Angelo A. De Falco, Irvington, N.J., assignor to Falcon Electronics Corp., Harrison, N.J., a corporation of New Jersey
Filed Oct. 1, 1962, Ser. No. 227,454
3 Claims. (Cl. 200—122)

This invention relates to a thermally actuated control device which will introduce a time delay in an electrical circuit and more particularly to a thermal time delay control device having switching elements so disposed with respect to its thermally actuated energizing elements that the contacts of the switching elements can operate at a voltage much less or much greater than the voltage required to operate the energizing elements without significant interelement effect in the control device.

Prior art thermally actuated control devices utilizing the coefficient of expansion of a single longitudinally expandable member have heretofore been relatively large, complicated in construction, expensive to make, and quite susceptable to circuit oscillation and mechanical vibration (chatter) at the point where the contacts of the device are about to close.

The present invention seeks to eliminate such costly and complicated devices and to provide one of simpler construction, relatively smaller in size and of such rigid structural configuration that contact chatter of the switching element from mechanical shock and vibration in the frequency ranges in which such devices are commonly used is virtually eliminated.

In the present invention the thermally actuated time delay control device is characterized by relatively simple construction having a minimum of moving parts which reduces complicated assembly work and cost of manufacture and which will by reason of its simplicity of construction have increased reliability over existing prior art devices and easy adaptability to miniaturization.

The present invention overcomes the prior art problems by providing a thermally actuated time relay for an electrical circuit including a support means or housing base, a rigid inverted V-shaped actuating means formed on said support means, by flexibly and resiliently connecting; one end of a stiff thermally responsive actuating member disposed to expand and contract longitudinally with respect to said base in accordance with variations in current in the circuit to which its heating element housed inside the actuating member is connected; and one respective end of an integral stiff channel-shaped compensating member of fixed length and at least equal or greater stiffness to that of the thermally responsive actuating member; a spaced distance from each other on said support means so that when their free ends remote from the ends connected to the support means are connected to each other by means for releasing local strains at such interconnected ends, the support means, resilient connecting means and the inverted V-shaped actuating means, form a triangularly shaped arrangement whose apex is free for limited movement (and the inverted V-shaped actuating means is in operative association with a contact assembly including a movable contact and an adjustable stationary contact; the movable contact being connected to the compensating member of the inverted V-shaped actuating means and so disposed thereon that it will move into and out of contact with the stationary contact in its adjusted position when the inverted V-shaped actuating means is deflected and returned under expansion and contraction of the actuating member from the vertical reference axis or centerline for the triangularly shaped actuating assembly).

The invention is further characterized by a lost motion means connecting the movable contact means to the relatively stiff channel shaped compensating member to permit the compensating member or inverted V-shaped actuating means to overtravel and thus relieve unnecessary stresses which develop during the sustained operation of the present device.

Accordingly it is an object of the present invention to provide a highly simplified thermally actuated time delay device which may be made in relatively small sizes at low cost and without sacrificing accuracy of operation.

Other objects and advantages of the invention including the basic design and the nature of the improvement thereon will appear from the following description taken in conjunction with the following drawings in which.

Figure 1:
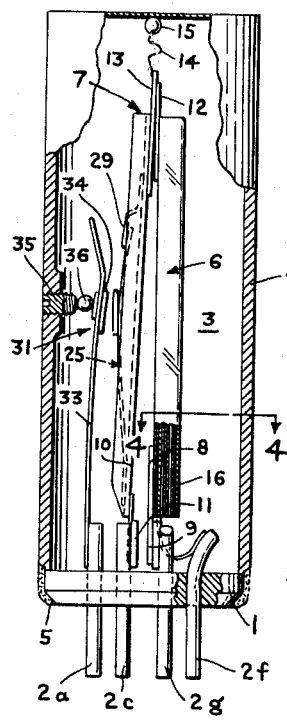
FIGURE 1 is a side view showing the thermal time delay unit in open position with the casing in vertical section.

Referring to the drawings, FIGURE 1 shows a thermally actuated time delay control device having a support means or housing base 1 of a nonconducting or insulating type of material which base 1 has a plurality of circumferentially spaced contact prongs $2a$, $2b$, $2c$, $2d$, $2e$, $2f$ and $2g$ extending therethrough so that a portion of the contact prongs will extend to the exterior of the time delay control device and a portion will extend into the chamber 3 formed when the casing 4 is connected to the flange 5 formed on the support means of base 1 as by welding or any other suitable means well known in the art.

After the container or casing 4 is soldered or sealed to the base 1 by any suitable means the present device may be made hermetic by withdrawing the air in chamber 3 and then sealing by any other conventional means also well known in the art. Such hermetic construction is not necessary except in those applications where corrosive effect will be detrimental to the overall operation of the device.

In the chamber 3 a primary or actuating member 6 and a secondary or compensating member 7 are shown. One end of the primary or actuating member 6 is connected by a resilient or relatively flexible hinge element 8 to a transverse bracket 9 connected by a resilient or relatively flexible hinge element 10 to another transverse bracket 11 connected between the respective inner portion of the contact prongs $2c$ and $2h$.

Since the contacts $2c$ and $2h$ are spaced from contacts $2d$ and $2g$ these respective ends of the actuating member 6 and compensating member 7 connected to these contacts will be spaced from each other. Remote from these ends so connected the free ends of the respective members 6 and 7 will also be connected to each other by means of the resilient or flexible connecting strips 12 and 13 so as to form an inverted V-shaped actuating means.

In cross-section the support means or housing base 1 and the inverted V-shaped actuating means formed with the resilient connections 8, 10, 12 and 13 are found to provide a triangular-shaped actuating assembly wherein the apex of the triangle is adapted for limited free movement in space within the stress limits of the respective actuating member 6 and compensating member 7 and the restrictive action of the compensating member itself during longitudinal expansion and contraction of this member.

In the triangularly-shaped actuating assembly described the degree of rigidity or stiffness of the inverted V-shaped actuating means must be of a specific quantity in order to obtain proper operation of the present device. This quantity of rigidity or stiffness is determined by the connecting hinges 8 and 10. Not only must the actuating member 6 and compensating member 7 be of substantially equal stiffness relative to each other and of such a nature that no significant bending will occur along the length of either of these members; but further the stiffness of the members must be such that the connecting hinges are relatively flexible with respect to the stiffness of members 6 and 7 so that binding or flexing of the inverted V-shaped actuating means occurs at the respective hinge connections alone.

This flexibility of the connecting hinges may be accomplished by attaching separate thin gauge strip material between the channel member and actuating member and the support means as has been described in the present invention or by other means which are well known in the art such as leaving a small portion of material extend beyond the channeled section at each end of the compensating member and having a hole punched in this extension to lessen the amount of material thereby making it more flexible than the channel portion of the same member or by any other means such as will be understood by those skilled in the art.

In substance the inverted V-shaped actuating means under the action of the actuating member 6 will move as a unit so that the apex of the inverted V-shaped actuating means remote from the support means can be rotated on an arc which utilizes the flexing of the connecting hinges to control the relative free movement of the apex. In this movement it is clear that the connecting means 12 and 13 act to relieve the bending stresses which are produced by the longitudinal expansion of the actuating member relative to the compensating member as they move in this integrated and integral fashion.

A spring or resilient means 14 is connected to the members 12 and 13 and extends away from the triangular structure so that the end remote from the connected end which has a glass bead or the like insulating element 15 can bear against the inner surface of the cover 4 and by its cushioning action serve to stabilize the operation of the inverted V-shaped actuating means, particularly with respect to vibration effect.

*Actuating assembly*

The triangularly shaped actuating assembly thus formed is for moving a movable contact means of the relay into engagement with an adjustable stationary contact means referred to more fully hereinafter. It will depend for its basic operation on actuating member 6, the compensating member 7, and their respective flexible resilient connecting hinges 8 and 10 and to a lesser extent the stress relieving elements 12 and 13.

The actuating member 6 is substantially similar in both structures and operation to the corresponding element shown in my Patent 2,817,731 issued December 24, 1957, and my copending application Ser. No. 654,903 filed April 24, 1957.

Figure 4:
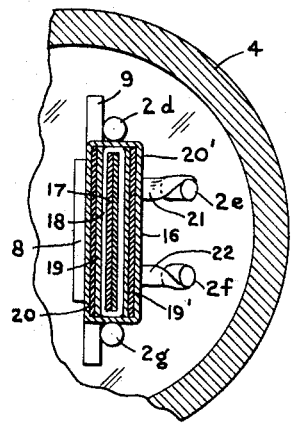
FIGURE 4 is a partial cross-section taken on line 4—4 of FIGURE 1.
Figure 5:
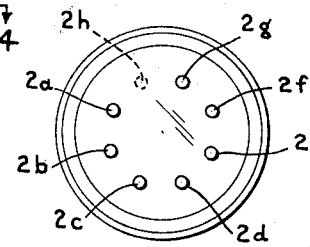
FIGURE 5 is a bottom view of the unit shown in FIGURE 1.
Figure 2:
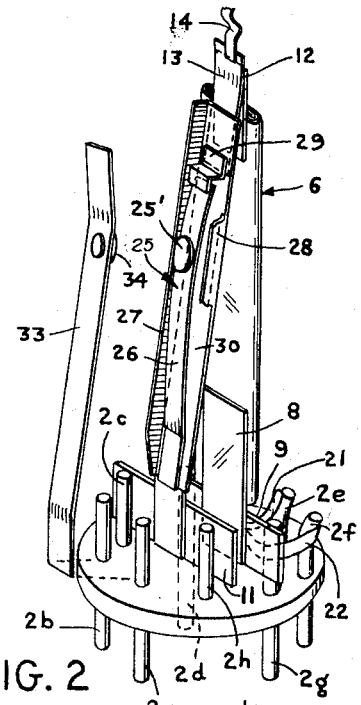
FIGURE 2 is a perspective view showing a portion of the interior of the unit shown in FIGURE 1.

Thus FIGURES 1, 2 and 4 show the actuating member 6 as including a shell or expander element 16 which is preferably struck from a piece of sheet metal such as stainless steel or the like type alloy having a high coefficient of expansion.

The expander element 16 houses or encloses in compact and closely sandwiched form a heater comprising the conventional mica element 17 with a coil of electric wire 18 wound thereabout. Insulating elements 19 and 19' on opposite sides of the heater are of mica and fillers 20 and 20' are provided to add to the mass enclosed by the expander element 16.

It will be understood that the insulating elements can be varied as to thickness and that the fillers can be eliminated for the purpose of varying the mass or the stiffness of the actuating member 6.

The coil element 18 is connected to the prongs 2e and 2f by means of electric current-carrying wires 21 and 22. Since the prongs 2e and 2f communicate with the circuit in which the relay is connected, the variable current signals from the circuit are delivered via wires 21 and 22 to the coil element 18 and will cause the amount of heat delivered by the element 18 to vary. This varying heat acts directly to produce relative expansion and contraction of the actuating member 6 directly proportional to the signal delivered by the circuit.

The relative mass to surface area of the actuating member 6 can be regulated by the thickness of the elements 19, 19', 20 and 20' and by adjusting the mica thickness or the thickness of the sheet metal from which member 16 is stamped. By this means it is easy to obtain the desired degree of expansion and contraction with variation in the heat developed by the current delivered to the element 11 and also to provide the stiff characteristic for this longitudinally expandable element necessary to the operation of the present invention.

The compensating member or leg 7 is a stiff integral channel-type element made either of a single piece or multi-piece construction. It has a fixed predetermined length and is so positioned to the base relative the actuating member 6 as above described that it provides the desired inverted V-shaped actuating means and forms the configuration for the triangular-shaped actuating assembly of the present device.

In the preferred form of the invention the member 7 is shown as channel-shaped because channel-shaped members have the necessary stiffness which in the present instance in order to provide the desired operation must be at least equal to and preferably stiffer than that of the relative stiffness of the actuating member 6. It will of course be apparent to those skilled in the art that the compensating member can be made of a solid bar material. However, solid bar material will increase cost of manufacture in that both assembly of parts and their desired operation will be more difficult to achieve with such construction.

The compensating member is also made of stainless steel or a like alloy corresponding to the material from which the expander element 16 is made and since it has a fixed predetermined length it will with changes in ambient temperature expand and contract substantially equal to the corresponding changes which will occur in the actuating member 6. Thus this member will counterbalance or compensate for expansion and contraction of the actuating member 6 due to the changes in the sensible temperature in which the thermal time delay device operates and the elements will automatically maintain at a constant value the gap between the hereinafter referred to movable contact means and the stationary contact means of the relay.

The stiff characteristic of the compensating member and the actuating member provide fixed movement because the longitudinal linear movement of the actuating member 6 is controlled by the compensating member 7. Hence a contact disposed at any point on the inverted V-shaped actuating means formed by these elements will be moved uniformly on each expansion and contraction of the actuating member 6 a distance equal to the movement of the particular portion of the inverted V-shaped actuating means to which it is connected.

Thus the inverted V-shaped actuating means of the triangular-shaped actuating assembly can be operatively associated with a contact assembly when it is deflected from and returned to the vertical reference axis or centerline thereof on elongation and contraction of the actuating member 6.

*Contact assembly*

The contact assembly comprises a movable contact means and a coacting adjustable stationary contact means.

In the preferred form of the invention as shown in the drawings, the movable contact means 25 is provided by a resilient strip-type holder 26 which has a contact 25' connected adjacent one end. The end remote from the contact-carrying end is connected as by welding or other suitable means to the outside face or side of the compensating member 7 remote from the side adjacent the actuating member 6 and as is clearly shown in FIGURES 1 and 2 of the drawings this will place the contact means approximately two-thirds the distance from the base 1 to the bracket 13.

Figure 3:
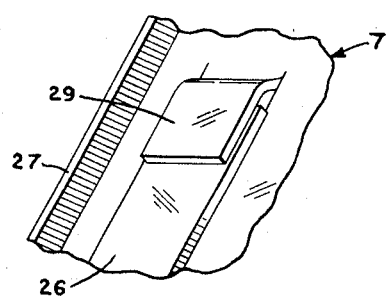
FIGURE 3 is a partial perspective side view of the compensating member showing the lost motion means.

In the preferred arrangement shown, advantage is taken of the channel-shaped characteristic of the compensating member. Thus the resilient holder 26 is nestled for convenience in the channel so that the free end which holds the contact 25' can be disposed or extended longitudinally between the flanged portions 27 and 28 of the channel structure and can be held in assembled position under slight tension by an L-shaped stop 29 which is shown in this form of the invention as struck from the center portion 30 of the channel forming the compensating member. However, as shown in FIGURES 1, 2 and 3 because of the clearance between the L-shaped stop 29 and the center portion 30 of the channel the contact-carrying end and the resilient holder 26 is free to travel to a limited extent independently of the movement of the compensating member 7.

The purpose of this limited movement is to provide a desirable stress-relieving lost motion means between the resilient holder 26 and the compensating member 7 when the triangular actuating assembly continues to deflect or distort after engagement is made between the movable contact means 25 and its coacting and adjustable stationary contact means 31.

Referring further to FIGURES 1 and 2, the adjustable stationary contact means 31 is shown as including an elongated resilient member 33 having a contact 34 at one end.

The elongated resilient member 33 is connected at the end remote from the contact 34 to the inner portion of the contact prongs 2a and 2b, and will be of a length such that the contact 34 will be in substantial alignment and will face the contact 25' on the movable contact assembly.

The resilient member 33 will be under a slight tension such that when free it will bend in a direction away from the contact 25'.

In order to move the resilient member 33 towards the movable contact 25' whereby the gap therebetween can be set for the desired length of time delay, an adjustment arrangement is provided by a set screw 35 threadably connected in and disposed to extend through casing 4 into the chamber 3 so that a glass bead or the like insulating element 36 formed on the inner or chamber end of the set screw 35 can be brought into continuous engagement with the side of resilient member 33 opposite to the side thereof carrying the contact 34 and act to move the resilient member 33 towards and away from the movable contact means 25' to form the desired gap.

As the set screw 35 is threaded into and out of the casing 4 the set screw will take place more or less tension on the resilient element 33 thus causing the contact 34 to move towards or away from the contact 25' as may be required for the desired conditions of time delay.

It will be understood that while this form of adjustment means is indicated in the present invention that other forms of adjustment means might be utilized such as attaching the contact directly to the end of the set screw by the use of suitable insulating means (not shown) and such adjustment means will not depart from the scope of the present invention.

*Operation*

Figure 6:
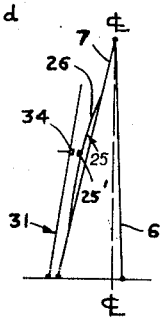
FIGURE 6 is a diagrammatic arrangement showing the unit and the contacts in open position.

Assume that the thermally actuated time delay device is connected into a current-carrying circuit in that the device is in a normally open position as shown in FIGURES 1 and 6 of the drawings.

In this position the actuating member 6 and the compensating member 7 are in equilibrium and the apex of the inverted V-shaped actuating means formed by these elements passes through a vertical reference axis of the triangularly-shaped actuating assembly of which it is a part.

As signals from the current-carrying circuit are fed into the coil element 18 of the actuating member 6, the member heats up and this causes the actuating member 6 to attempt longitudinal elongation at a rate commensurate with its coefficient of expansion and other factors of mass to surface area abovementioned.

However, it is clear from the present construction that substantial linear movement of the actuating member 6 is precluded because of the fixed length of the integrally formed compensating member and its characteristic of stiffness which is equal to or greater than that of the actuating member 6.

Figure 7:
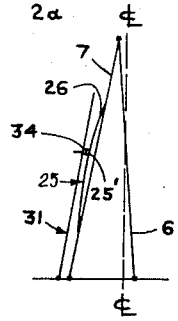
FIGURE 7 is a diagrammatic view showing the unit deflected from the centerline and the contacts in closed position.

Because such forces are acting both the actuating member 6 and compensating member 7 deflect or distort so that the apex of the inverted V-shaped actuating means is moved off the vertical reference axis or centerline of its initial equilibrium position of the triangularly-shaped actuating assembly of which it is a part to the position illustrated in FIGURE 7.

In substance, the flexibility of the hinges 9 and 11 connecting the ends of the respective elements 6 and 7 to the support base 1 permit limited bending movement of the triangularly-shaped actuating assembly without distorting the assembly beyond its elastic limits and the connecting elements 12 and 13 relieve local strain between the interconnected ends of the elements 6 and 7.

Since the resilient strip holder 26 is fixedly connected to the compensating member 7 it will also move with the triangular structure to bring the contact 25' into engagement with the stationary contact 34.

After engagement between the contacts 25' and 34 occurs if the triangular structure continues to deflect towards the contact 34 the elements will not become overstressed beyond their elastic limit because of the lost motion arrangement provided between the resilient strip holder 26 and the L-shaped stop 29 above-described.

The contacts 25 and 34 will remain in engagement until the current to the element 18 is stopped. When this occurs the heater and the actuating member 6 will be caused to cool and as they cool will contract. Now as the inverted V-shaped actuating means counter-rotates about the hinges 9 and 11 it will swing in a direction away from the contact 34 and the contact 25', to cause resilient element 26 to be moved laterally away from the stationary contact 34 until engagement is broken therewith and the electrical current-carrying circuit in communication with these contacts will be open.

While the preferred form of the invention shows the contacts normally open as indicated in FIGURES 1 and 6, it will be understood by those skilled in the art that with a slight modification the contact 34 could be positioned relative the contact 25' to provide a normally closed set of contacts which will open when a current is passed to the coil 18 of the actuating member 6 and that such change would not depart from the scope of the present invention.

Although this invention has been described with reference to specific apparatus it will be appreciated that a wide variety of changes may be made within the ability of one skilled in the art without departing from the scope of this invention. For example, some of the components may be reversed, certain features of the invention may be used independently of others and equivalents may be substituted for the apparatus all within the spirit and scope of the invention as defined in the appended claims.

What is claimed is:

1. In a time delay control device to be connected in a current carrying circuit, a support means, a thermally responsive actuating member having one end flexibly connected to said support means and communicating with said circuit to allow the free end of said member to expand longitudinally relative said support means in response to the thermal changes caused by variations in the current in said circuit, said thermally responsive actuating member of relatively stiff construction, a compensating member of one piece channel construction and at least equal stiffness to said thermally responsive actuating member flexibly connected at one end to said support means a spaced distance from said actuating member, and stress relieving means connecting the other respective end of said compensating member directly to the free end of said actuating member to form an inverted V-shaped actuating means, a stationary contact mounted in said control device remote from the actuating member and intermediate the length of the inverted V-shaped actuating member, said inverted V-shaped actuating means and said support means disposed to form a triangularly shaped actuating assembly wherein said inverted V-shaped actuating means is adapted to deflect towards and away from said stationary contact on expansion and contraction of said actuating member, and a movable contact means operatively connected to said compensating member and nested in the channel portion thereof on the side remote from the actuating member, said movable contact means to be moved with movement of said inverted V-shaped actuating means into and out of engagement with said stationary contact, and means to adjustably space said stationary contact relative the movable contact means to provide a predetermined time delay desired for the control device.

2. In the combination as claimed in claim 1 wherein lost motion means disposed in said channel portion of said compensating member coacts with said movable contact means to permit limited overtravel of said compensating member after contact is established between said movable contact means and said stationary contact.

3. In the combination as claimed in claim 1 wherein said movable contact means includes a resilient arm, one end of said resilient arm connected adjacent the connected end of said compensating member, the other end of said resilient arm being free, a contact at a point on said resilient arm remote from the connected end thereof, and means on said compensating member coacting with the free end of said resilient arm to permit overtravel of said compensating member after said movable contact means is in engagement with said stationary contact.

References Cited by the Examiner

UNITED STATES PATENTS

| 908,679 | 1/09 | Kelley | 200—122 |
| 2,700,084 | 1/55 | Broekhuysen | 200—122 |
| 2,817,731 | 10/55 | De Falco | 200—122 |
| 2,820,120 | 1/58 | Flatt et al. | 200—113 |
| 2,977,440 | 3/61 | Lessner | 200—113 |

FOREIGN PATENTS

| 20,085 | 9/13 | Great Britain. |

BERNARD A. GILHEANY, *Primary Examiner.*

ROBERT K. SCHAEFER, *Examiner.*